United States Patent [19]

Gosser et al.

[11] Patent Number: 4,772,458

[45] Date of Patent: Sep. 20, 1988

[54] CATALYTIC PROCESS FOR MAKING HYDROGEN PEROXIDE FROM HYDROGEN AND OXYGEN EMPLOYING A BROMIDE PROMOTER

[75] Inventors: Lawrence W. Gosser, Wilmington, Del.; Jo-Ann T. Schwartz, Chadds Ford, Pa.

[73] Assignee: E. I. Du Pont de Nemours and Company, Wilmington, Del.

[21] Appl. No.: 932,360

[22] Filed: Nov. 19, 1986

[51] Int. Cl.$^4$ .................................... C01B 15/02
[52] U.S. Cl. ................................................ 423/584
[58] Field of Search ..................................... 423/584

[56] References Cited

U.S. PATENT DOCUMENTS

| | | | |
|---|---|---|---|
| 3,336,112 | 8/1967 | Hooper | 23/207 |
| 3,361,533 | 1/1968 | Hooper | 23/207 |
| 3,433,582 | 3/1969 | Campbell | 23/60 |
| 4,007,256 | 2/1977 | Kim et al. | 423/584 |
| 4,009,252 | 2/1977 | Izumi et al. | 423/584 |
| 4,279,883 | 7/1981 | Izumi et al. | 423/584 |
| 4,335,092 | 6/1982 | Dalton, Jr. et al. | 423/584 |
| 4,336,238 | 6/1982 | Dalton, Jr. et al. | 423/584 |
| 4,336,239 | 6/1982 | Dalton, Jr. et al. | 423/584 |
| 4,379,778 | 4/1983 | Dalton, Jr. et al. | 423/584 |
| 4,389,390 | 6/1983 | Dalton, Jr. et al. | 423/584 |
| 4,661,337 | 4/1987 | Brill | 423/584 |
| 4,681,751 | 7/1987 | Gosser | 423/584 |

OTHER PUBLICATIONS

Maass et al., The Properties of Pure Hydrogen Peroxide, J.A.C.S. 46 290 (1924).
Russian Journal of Physical Chemistry, 35(2):143–148 (1961), Pospelova et al.
Organic Peroxides, Wiley-Interscience, N.Y., p. 26 (1970), Swern.
Hydrogen Peroxide, Reinhold Pub. Corp., p. 179 (1955), Schumb et al.
Chemical and Engineering News, 62, Nov. 19, 1984, 4.
Chemical and Engineering News, 63, Jan. 7, 1985, 6.

Primary Examiner—John Doll
Assistant Examiner—Wayne A. Langel

[57] ABSTRACT

A process for making hydrogen peroxide from hydrogen and oxygen employing an aqueous reaction medium containing a bromide promoter is disclosed.

28 Claims, No Drawings

CATALYTIC PROCESS FOR MAKING HYDROGEN PEROXIDE FROM HYDROGEN AND OXYGEN EMPLOYING A BROMIDE PROMOTER

BACKGROUND OF THE INVENTION

1. Field of the Invention

This invention concerns an improved catalytic process for producing hydrogen peroxide from hydrogen and oxygen.

2. Background of the Invention

The following references disclose catalytic processes for producing hydrogen peroxide from hydrogen and oxygen. One problem associated with known direct combination processes is that product yields are too low for large scale commercial applications. Improved processes for producing hydrogen peroxide in high concentrations are of significant interest to the chemical industry.

U.S. Pat. No. 3,336,112 issued to Hooper, discloses a process for producing hydrogen peroxide. The process comprises contacting hydrogen and oxygen with a solid catalyst in the liquid phase in the presence of water and a hydrogen peroxide stabilizer, for example, a sequestrative hydrogen peroxide stabilizer. U.S. Pat. No. 3,361,533 issued to Hooper, discloses a process for the production of hydrogen peroxide. The process comprises contacting hydrogen and oxygen with a solid catalyst in the liquid phase in the presence of water, an acid and a non-acidic oxygen-containing organic compound.

U.S. Pat. No. 3,433,582 issued to Campbell, discloses a process for producing hydrogen peroxide. The process comprises contacting hydrogen and oxygen with a solid catalyst in a liquid medium containing water and dissolved boric acid. The reference discloses that there may also be present a second radical, especially a halogen or pseudo-halogen.

U.S. Pat. No. 4,007,256 issued to Kim et al., discloses a process for production hydrogen peroxide by contacting hydrogen and oxygen with a supported palladium catalyst in the presence of water, an organic nitrogen-containing compound and a strong acid. Posplova et al., Russian Journal of Physical Chemistry, 35(2):143-148 (1961) disclose palladium-catalyzed synthesis of hydrogen peroxide from hydrogen and oxygen. Palladium black and palladium deposited on alumina gel, tungstic anhydide, silica gel, and bone charcoal were used as the catalysts.

U.S. Pat. No. 4,009,252 issued to Izumi et al., discloses a process for preparing hydrogen peroxide by a catalytic reaction of hydrogen and oxygen in an aqueous medium containing a platinum-group catalyst. The process is characterized in that the partial pressure of hydrogen and the partial pressure of oxygen in the gaseous phase of the reaction system are maintained at at least 0.5 atmosphere and at least 1.0 atmosphere, respectively, The platinum group catalyst is caused to be present in an amount, calculated as metal, of at least a minimum effective catalytic amount up to 30 mg per 100 mL of the aqeous medium.

U.S. Pat. No. 4,279,883, issued to Izumi et al., discloses a process for preparing hydrogen peroxide by reacting hydrogen with oxygen in the presence of a catalyst in an aqueous medium containing hydrogen peroxide, the improvement which comprises using an aqueous medium which contains dissolved hydrogen and a platinum-group catalyst having adsorbed thereto hydrogen. Supported Pd catalysts with carbon, silica, and a number of other materials are described as equivalents for support purposes.

U.S. Pat. No. 4,335,092, issued to Dalton, Jr. et al., discloses a process for preparing hydrogen peroxide. Hydrogen and oxygen are contacted with a supported palladium catalyst in the presence of methanol. Preferably, the methanol contains up to 1.0% by weight of formaldehyde and is at least 0.001N in hydrochloric acid.

U.S. Pat. No. 4,336,238, issued to Dalton, Jr. et al., discloses an improvement in a process for producing hydrogen peroxide by contacting a mixture of hydrogen and oxygen with a palladium on carbon catalyst in the presence of an acidic aqueous liquid capable of inhibiting decomposition of hydrogen peroxide. The improvement comprises prolonging the useful life of the catalyst by continuous removal of palladium salts produced by solubilization of the catalyst from the acidic aqueous liquid. The medium employed comprises up to 95% by volume of an organic solvent. Moreover, $H_2O_2$ concentrations are very low.

U.S. Pat. No. 4,336,239, issued to Dalton, Jr. et al., discloses an improvement in hydrogen peroxide synthesis from hydrogen and oxygen in an acidic medium containing an oxygenated or nitrogenous organic compound using a supported Group VIII noble metal catalyst. The improvement comprises using an oxygen/hydrogen ratio higher than about 3.4 and a catalyst level above 30 mg per 100 mL of medium.

U.S. Pat. No. 4,379,778, issued to Dalton, Jr. et al., discloses improvements in palladium-carbon catalysts for the production of hydrogen peroxide from a mixture of hydrogen and oxygen in the presence of an aqueous liquid capable of inhibiting the decomposition of hydrogen peroxide. The improvement comprises pretreating the catalyst with an aldehyde or ketone, and, preferably, also pretreating the catalyst with a dilute solution of hydrochloric acid. Improved catalysts are obtained by reducing a soluble palladium compound deposited on a high surface area non-graphitic carbon base, in the form of a dried powder, with hydrogen at 27°-200° C.

U.S. Pat. No. 4,389,390, issued to Dalton, Jr. et al., discloses an improvement in a process for producing hydrogen peroxide by contacting a mixture of hydrogen and oxygen with a palladium on carbon catalyst in the presence of an acidic liquid capable of inhibiting decomposition of thus-produced hydrogen peroxide. The improvement comprises prolonging the useful life of the catalyst by continuous removal of palladium salts produced by solubilization of the catalyst from the acidic liquid, preferably by employing high surface area activated carbon as the catalyst support and adsorbent for palladium salts.

The following four publications disclose the danger inherent in producing hydrogen peroxide in the presence of an organic component. Swern, *Organic Peroxides*, Wiley-Interscience, New York, page 26, (1970) discloses the preparation of peroxy compounds from aldehydes and hydrogen peroxide. The reference discloses that extreme caution should be taken when handling and preparing ketone peroxides, since some are very sensitive and explode with violence. Schumb et al., *Hydrogen Peroxide*, Reinhold Publishing Corporation, page 179 (1955) describes explosive characteristics of solutions of methyl alcohol, ethyl alcohol, or glycerine in concentrated hydrogen peroxide. Halle, *Chemical* and *Engineering News,* 62(27):4 (1984) describes potential hazards associated with organic peroxides. Schwoegler, *Chemical and Engineering News,* 63(1):6 (1985) describes the shock sensitivity of acetone peroxides.

Commonly-assigned U.S. Ser. No. 726,695, Notice of Allowance mailed June 20, 1986, discloses a method for making hydrogen peroxide from hydrogen and oxygen employing a catalytically effective amount of Pd on adsorbent carbon. The disclosure of this allowed U.S. application is incorporated herein by reference.

SUMMARY OF THE INVENTION

This invention concerns an improved catalytic process for making hydrogen peroxide from hydrogen and oxygen in a reaction medium. The improvement comprises (i) employing a catalytically effective amount of palladium, platinum, or a combination thereof, (ii) employing an aqueous reaction medium comprising an acid component and a bromide promoter, and (iii) employing the acid component and bromide promoter in amounts to provide a molar ratio of hydrogen ion to bromide ion of at least about 2:1 in the reaction medium.

DETAILED DESCRIPTION OF THE INVENTION

The present invention provides an improved catalytic process for making hydrogen peroxide from hydrogen and oxygen. It has been found that high product yields can be achieved by employing an aqueous reaction medium comprising an acid component and a bromide promoter in specified molar amounts and a catalytically effective amount of palladium, platinum, or a combination thereof. These high product yields make the present method commercially feasible for large-scale applications.

The process of this invention employs a catalytically effective amount of palladium, platinum, or a combination thereof. The form of the specified metals is not critical. The metals can be employed in the form of metal ions as a result of using palladium and/or platinum salts or in the form of bulk metal. The specified metals can also be employed in the form of a supported catalyst, optionally a supported catalyst prepared from a metal colloid. Suitable supports include various forms of carbon, silica, alumina, or ion exchange resins. Preferably, the ratio of palladium to platinum is above about 20 weight percent, and most preferably above about 50 weight percent. In one embodiment, the specified metals are employed in the form of a metal colloid.

Regardless whether the catalyst is premade or made in situ in the aqueous reaction medium, the latter will comprise an acid component and a bromide promoter. As used herein, the expression "bromide promoter" includes any source capable of generating bromide ions in the reaction medium. The bromide ion source can, for example, be HBr, a soluble metal bromide or a compound hydrolyzable or reducible to afford bromide ion under reaction conditions. One improvement represented by employing a bromide promoter is that less halide can be employed to produce equivalent or superior product yields as compared to other halide promoters. Thus, hydrogen peroxide solutions can be produced that contain relatively low concentrations of halide ion, as desired in certain hydrogen peroxide applications, such as in electronic applications. Although halide ions can be removed from hydrogen peroxide solutions contaminated therewith by various means, including treatment with ion exchange materials, the lower the initial halide ion concentration, the lower the cost of such treatment.

Preferably, the bromide ion concentration in the reaction medium is from about $1 \times 10^{-7}$M to about 0.1M, and most preferably, from about $5 \times 10^{-5}$M to about 0.01M. The molar ratio of bromide ion to metal (Pd and/or Pt) is generally from about $10^{-4}$:1 to about $10^4$:1, preferably from about $10^2$:1 to about $10^{-3}$:1, and most preferably 10:1 to about $10^{-2}$:1.

Chloride and other compatible halide ions can also be present in the reaction medium, but preferably the concentration of halide ions other than bromide ion is not greater than the concentration of the bromide ion. Preferably, the total halide ion concentration is not greater than about $10^{-1}$M, in keeping with the desire to produce low halide content hydrogen peroxide product.

It has been found that hydrogen peroxide concentrations are increased by employing the acid component and bromide promoter in amounts to provide a molar ratio of hydrogen ion to bromide ion of at least about 2:1 in the reaction medium. Suitable acids include hydrochloric, phosphoric, sulfuric, nitric and perchloric. Other protonic acids having a pK less than about 8 can be employed provided that they are compatible with other components of the reaction medium. Preferably, the hydrogen ion concentration in the reaction medium is from about $1 \times 10^{-5}$M to about 10M, and most preferably from about $1 \times 10^{-3}$M to about 2M. The molar ratio of hydrogen ion to bromide ion in the reaction medium is preferably of from about 5:1 to about $10^6$:1, more preferably from about 10:1 to about $10^4$:1, and most preferably from about 100:1 to about $10^4$:1. The concentrations of acid and bromide promoter are interrelated, so that best results are achieved with relatively high acid concentrations when the halide concentrations are at the low end of the recited ranges.

Typically, the process has been run at relative ambient partial pressures of $O_2$ to $H_2$ of about 2 to 1 up to 20 to 1 or higher. Ratios of 20 to 1 and above are preferred to avoid the possibility of explosion during continuous process runs. Although ratios of less than 2 to 1 can be employed, such ratios may result in lower hydrogen peroxide concentrations.

The process can be carried out at $-50°$ C. to $90°$ C. and preferably from about $0°$ C. to $50°$ C. Lower temperatures can be employed so long as liquid freezing is not a problem. Depending on the type and concentration of reaction ingredients, temperatures below $-10°$ C. are contemplated. Presence of about 45 weight percent hydrogen peroxide in the reaction mixture will permit operation at $-50°$ C. without freezing. It has been found that higher temperatures can be employed provided that the reaction system is free of impurities that promote hydrogen peroxide decomposition.

Preferably the present process is conducted at a superatmospheric pressure. Preferred pressures are in the range of from about 200 psig (1.48 MPa) to 4000 psig (27.7 MPa) with increasing hydrogen peroxide concentrations resulting from use of higher pressures. Most preferred pressures for hydrogen peroxide formation are about 400 psig (2.86 MPa) to 2500 psig (17.34 MPa). In semibatch operation, with gases continuously entering and exiting the reactor, peroxide concentrations above about 30% can be achieved at about 10 MPa and an inlet $O_2/H_2$ ratio of about 4:1.

An advantage of the use of a substantially all-aqueous medium is that explosion hazards associated with the combination of high hydrogen peroxide concentrations and organic cosolvents are absent. Another advantage is that a large organic recycle stream is avoided. Other advantages include the lessening of explosive hazards caused by buildup of organic peroxy compounds and elimination of catalyst deactivation caused by decomposition of organic materials.

In a most preferred embodiment, continuous operation of the process of this invention is conducted at about 1000 psig (7.0 MPa) total pressure, a $O_2/H_2$ inlet ratio of about 3:1, about 0.025M $H_2SO_4$, and about 20° C., with vigorous gas-liquid contact.

The invention is further described in the following Examples wherein all parts and percentages are by weight and degrees are Celsius, unless otherwise stated. The weight percent $H_2O_2$ was obtained by titration with potassium permanganate solution. The weight gain and weight percent $H_2O_2$ were used to calculate the selectivity as moles $H_2O_2$ found divided by the sum of the moles of water formed and the moles of $H_2O_2$ formed. This value was multiplied by 100 to give the selectivity in percent. In the Examples and Comparative Experiments mesh sizes refer to U.S. Standard sieve units.

EXAMPLE 1

A reaction mixture was prepared from 5 mg of a 5% Pd on carbon catalyst (400–500 mesh), 18 g purified water, 1.0 g of 1.0N $H_2SO_4$ and 1.0 g of 0.001N NaBr. The mixture was placed in a 400 mL autoclave containing a glass liner. The autoclave was mounted on a shaking table in a large metal barricade with facilities for adding and removing gases and monitoring temperature and pressure from outside the barricade. The charged autoclave was pressure tested and evacuated. Then, 2.48 MPa of $H_2$ were added to the autoclave and $O_2$ was added to bring the total pressure to 13.9 MPa. After 15 minutes, $O_2$ was, again, added to bring the pressure up to 13.9 MPa. During the the reaction the temperature of the autoclave was between 15° and 19°. The reaction resulted in a pressure drop of 1.63 MPa. After three hours of agitation, the weight gain of the reaction mixture was 3.8 g, the $H_2O_2$ content was 12.6 weight percent, and selectivity to $H_2O_2$ was 66%. These results are shown in Table 1.

COMPARATIVE EXPERIMENTS A AND B

The procedure described in Example 1 was substantially repeated two times, except that a chloride promoter was employed. The apparatus used was the 400 mL autoclave described in Example 1. The reaction mixtures were prepared from 5 mg of the 5% Pd on carbon catalyst (400–500 mesh), 18 g purified water, 1.0 g of 1.0N $H_2SO_4$ and 1.0 g of 0.001N NaCl solution. In each experiment, the charged autoclave was pressure tested and evacuated. Then, 2.48 MPa of $H_2$ were added to the autoclave and $O_2$ was added to bring the total pressure to 13.9 MPa. After 15 minutes, $O_2$ was, again, added to bring the pressure up to 13.9 MPa. During the reactions, the temperature of the autoclave was between 14° and 19°. The reactions resulted in pressure drops of 4.24 MPa and 2.46 MPa. After three hours of agitation, the weight gains of the reaction mixtures were 3.95 g and 4.05 g, the $H_2O_2$ contents were 1.9 and 2.3 weight percent, and selectivities to $H_2O_2$ were 6.4% and 7.7%, respectively. These results are shown in Table 1.

TABLE 1

| | | Hydrogen Peroxide Yields from Bromide and Chloride Promoters | | |
|---|---|---|---|---|
| Ex. | Comp. Exp. | Promoter(mmol) | Wt % $H_2O_2$ | Wt. Gain (g) |
| 1 | | Bromide(0.001) | 12.6 | 3.8 |
| | A | Chloride(0.001) | 1.9 | 4.0 |
| | B | Chloride(0.001) | 2.3 | 4.0 |

EXAMPLE 2

The apparatus used was the 400 mL autoclave described in Example 1. The reaction mixture was prepared from 20 mg of a 5% Pd on silica gel catalyst (400 mesh), 18 g purified water, 1.0 g of 1.0N $H_2SO_4$ and 1.0 g of 0.001N NaBr solution. The charged autoclave was pressure tested and evacuated. Then, 2.48 MPa of $H_2$ were added to the autoclave and $O_2$ was added to bring the total pressure to 13.9 MPa. After 15 minutes, $O_2$ was, again, added to bring the pressure up to 13.9 MPa. During the reaction, the temperature of the autoclave was between 15° and 19°. The reaction resulted in a pressure drop of 2.66 MPa. After three hours of agitation, the weight gain of the reaction mixture was 4.72 g, the $H_2O_2$ content 11.7 weight percent, and selectivity to $H_2O_2$ was 46%. These results are shown in Table 2.

COMPARATIVE EXPERIMENTS C AND D

The procedure described in Example 2 was substantially repeated two times, except that a chloride promoter was employed. The apparatus used was the 400 mL autoclave described in Example 1. The reaction mixtures were prepared from 20 mg of the 5% Pd on silica gel (400 mesh), 18 g purified water, 1.0 g of 1.0N $H_2SO_4$ and 1.0 g of 0.001N NaCl solution. In each experiment, the charged autoclave was pressure tested and evacuated. Then, 2.48 MPa of $H_2$ were added to the autoclave and $O_2$ was added to bring the total pressure to 13.9 MPa. After 15 minutes, $O_2$ was, again, added to bring the pressure up to 13.9 MPa. During the reaction, the temperature of the autoclave was between 14° and 19°. After three hours of agitation, the reactions resulted in pressure drops of 2.69 MPa and 2.45 MPa. The weight gains of the reaction mixtures were 3.81 g and 3.80 g, the $H_2O_2$ contents were each 0.1 weight percent, and selectivities to $H_2O_2$ were each 0.3%. These results are shown in Table 2.

TABLE 2

| | | Hydrogen Peroxide Yields from Bromide and Chloride Promoters | | |
|---|---|---|---|---|
| Ex. | Comp. Exp. | Promoter(mmol) | Wt % $H_2O_2$ | Wt. Gain (g) |
| 2 | | Bromide(0.001) | 11.7 | 4.7 |
| | C | Chloride(0.001) | 0.1 | 3.8 |
| | D | Chloride(0.001) | 0.1 | 3.8 |

EXAMPLE 3

The apparatus used was the 400 mL autoclave described in Example 1. The reaction mixture was prepared from 50 mg of a 1% Pd on alpha alumina catalyst (325 mesh), 18 g purified water, 1.0 g of 1.0N $H_2SO_4$ and 1.0 g of 0.01N NaBr solution. The mixture was placed in a sonic cleaner bath for a couple of minutes to disperse the catalyst. The charged autoclave was pressure tested and evacuated. Then, 2.48 MPa of $H_2$ were added to the autoclave and $O_2$ was added to bring the total pressure to 13.9 MPa. After 15 minutes, O$_2$ was, again, added to bring the pressure up to 13.9 MPa. During the reaction, the temperature of the autoclave was between 17° and 20°. The reaction resulted in a pressure drop of 6.4 MPa. After three hours of agitation, the weight gain of the reaction mixture was 1.23 g, the H$_2$O$_2$ content was 4.7 weight percent, and selectivity to H$_2$O$_2$ was 65%. These results are shown in Table 3.

COMPARATIVE EXAMPLES E AND F

The procedure described in Example 3 was substantially repeated two times, except that a chloride promoter was employed. The apparatus used was the 400 mL autoclave described in Example 1. The reaction mixtures were prepared from 50 mg of the 1% Pd on alpha alumina catalyst (325 mesh), 18 g purified water, 1.0 g of 1.0N H$_2$SO$_4$ and 1.0 g of 0.01N NaCl solution. In each experiment, the charged autoclave was pressure tested and evacuated. Then, 2.48 MPa of H$_2$ were added to the autoclave and O$_2$ was added to bring the total pressure to 13.9 MPa. After 15 minutes, O$_2$ was, again, added to bring the pressure up to 13.9 MPa. During the reactions, the temperature of the autoclave was between 16° and 21°. The reactions resulted in pressure drops of 2.87 MPa and 2.21 MPa. After three hours of agitation, the weight gains of the reaction mixtures were 3.28 g and 3.32 g, the H$_2$O$_2$ contents were 2.7 and 2.9 weight percent, and selectivities to H$_2$O$_2$ were 11% and 12%, respectively. These results are shown in Table 3.

TABLE 3

| | | Hydrogen Peroxide Yields from Bromide and Chloride Promoters | | |
|---|---|---|---|---|
| Ex. | Comp. Exp. | Promoter(mmol) | Wt % H$_2$O$_2$ | Wt. Gain (g) |
| 3 | | Bromide(0.01) | 4.7 | 1.2 |
| | E | Chloride(0.01) | 2.7 | 3.3 |
| | F | Chloride(0.01) | 2.9 | 3.3 |

EXAMPLE 4

The apparatus used was the 400 mL autoclave described in Example 1. The reaction mixture was prepared from 5 mg of a 1% Pt on carbon catalyst, 18 g purified water, 1.0 g of 1.0N H$_2$SO$_4$ and 1.0 g of 0.1N NaBr solution. The mixture was placed in a sonic cleaner bath for a couple of minutes to disperse the catalyst. The charged autoclave was pressure tested and evacuated. Then, 2.48 MPa of H$_2$ were added to the autoclave and O$_2$ was added to bring the total pressure to 14.0 MPa. After 15 minutes, O$_2$ was, again, added to bring the pressure up to 14.0 MPa. During the reaction, the temperature of the autoclave was between 16° and 21°. The reaction resulted in a pressure drop of 5.24 MPa. After three hours of agitation, the weight gain of the reaction mixture was 3.51 g, the H$_2$O$_2$ content was 9.3 weight percent, and selectivity to H$_2$O$_2$ was 47%. These results are shown in Table 4.

COMPARATIVE EXPERIMENT G

The procedure described in Example 3 was substantially repeated, except that a chloride promoter was employed. The apparatus used was the 400 mL autoclave described in Example 1. The reaction mixtures were prepared from 5 mg of the 1% Pt on carbon catalyst, 18 g purified water, 1.0 g of 1.0N H$_2$SO$_4$ and 1.0 g of 0.1N NaCl solution. The charged autoclave was pressure tested and evacuated. Then, 2.48 MPa of H$_2$ were added to the autoclave and O$_2$ was added to bring the total pressure to 13.9 MPa. After 15 minutes, O$_2$ was, again, added to bring the pressure up to 13.9 MPa. During the reaction, the temperature of the autoclave was between 14° and 19°. The reaction resulted in a pressure drop of 3.58 MPa. After three hours of agitation, the weight gain of the reaction mixtures was 3.19 g, the H$_2$O$_2$ content was 2.3 weight percent, and selectivity to H$_2$O$_2$ was 10%. These results are shown in Table 4.

TABLE 4

| | | Hydrogen Peroxide Yields from Bromide and Chloride Promoters | | |
|---|---|---|---|---|
| Ex. | Comp. Exp. | Promoter(mmol) | Wt % H$_2$O$_2$ | Wt. Gain (g) |
| 4 | | Bromide(0.1) | 9.3 | 3.5 |
| | G | Chloride(0.1) | 2.3 | 3.2 |

EXAMPLES 5 AND 6

The apparatus used was the 400 mL autoclave described in Example 1. The reaction mixtures were prepared from 20 mg of a 5% Pt on silica catalyst, 18 g purified water, 1.0 g of 1.0N H$_2$SO$_4$ and 1.0 g of 0.1N NaBr solution. The mixtures were placed in a sonic cleaner bath for a couple of minutes to disperse the catalyst. In each Example, the autoclave was pressure tested and evacuated. Then, 2.48 MPa of H$_2$ were added to the autoclave and O$_2$ was added to bring the total pressure to 14.0 MPa. After 15 minutes, O$_2$ was, again, added to bring the pressure up to 14.0 MPa. During the reactions, the temperature of the autoclave was between 15° and 19°. The reactions resulted in pressure drops of 1.85 MPa and 2.60 MPa. After three hours of agitation, the weight gains of the reaction mixtures were 3.42 g and 3.67 g, the H$_2$O$_2$ contents were 6.5 and 6.9 weight percent, respectively, and selectivities to H$_2$O$_2$ were each 30%. The results are shown in Table 5.

COMPARATIVE EXPERIMENT H

The procedure described in Examples 5 and 6 was substantially repeated, except that a chloride promoter was employed. The apparatus used was the 400 mL autoclave described in Example 1. The reaction mixtures were prepared from 20 mg of the 5% Pt on silica catalyst, 18 g purified water, 1.0 g of 1.0N H$_2$SO$_4$ and 1.0 g of 0.1N NaCl solution. The charged autoclave was pressure tested and evacuated. Then, 2.48 MPa of H$_2$ were added to the autoclave and O$_2$ was added to bring the total pressure to 13.9 MPa. After 15 minutes, O$_2$ was, again, added to bring the pressure up to 13.9 MPa. During the reaction, the temperature of the autoclave was between 16° and 19°. The reaction resulted in a pressure drop of 3.16 MPa. After three hours of agitation, the weight gain of the reaction mixtures was 3.53 g, the H$_2$O$_2$ content was 0.1 weight percent, and the selectivity to H$_2$O$_2$ was 0.4%. The results are shown in Table 5.

TABLE 5

| | | Hydrogen Peroxide Yields from Bromide and Chloride Promoters | | |
|---|---|---|---|---|
| Ex. | Comp. Exp. | Promoter(mmol) | Wt % H$_2$O$_2$ | Wt. Gain (g) |
| 5 | | Bromide(0.1) | 6.5 | 3.4 |
| 6 | | Bromide(0.1) | 6.9 | 3.7 |

TABLE 5-continued

Hydrogen Peroxide Yields from Bromide and Chloride Promoters

| Ex. | Comp. Exp. | Promoter(mmol) | Wt % $H_2O_2$ | Wt. Gain (g) |
|---|---|---|---|---|
| | H | Chloride(0.1) | 0.1 | 3.5 |

EXAMPLES 7 AND 8

The apparatus used was the 400 mL autoclave described in Example 1. The reaction mixtures were prepared from 5 mg of a 1% Pt on alpha alumina catalyst (325 mesh), 18 g purified water, 1.0 g of 1.0N $H_2SO_4$ and 1 0 g of 0.1N NaBr solution. The mixtures were placed in a sonic cleaner bath for a couple of minutes to disperse the catalyst. In each Example, the charged autoclave was pressure tested and evacuated. Then, 2.48 MPa of $H_2$ were added to the autoclave and $O_2$ was added to bring the total pressure to 14.0 MPa. After 15 minutes, $O_2$ was, again, added to bring the pressure up to 14.0 MPa. During the reaction, the temperature of the autoclave was between 14° and 18°. The reactions resulted in pressure drops of 2.14 MPa and 1.79 MPa. After three hours of agitation, the weight gains of the reaction mixtures were 3.86 g and 2.60 g, the $H_2O_2$ contents were 8.6 and 6.1 weight percent, and the selectivities to $H_2O_2$ were 38% and 37%, respectively. These results are shown in Table 6.

COMPARATIVE EXPERIMENT I

The procedure described in Examples 7 and 8 was substantially repeated, except that a chloride promoter was employed. The apparatus used was the 400 mL autoclave described in Example 1. The reaction mixtures were prepared from 5 mg of the 1% Pt on alpha alumina catalyst (325 mesh), 18 g purified water, 1.0 g of 1.0N $H_2SO_4$ and 1.0 g of 0.1N NaCl solution. The charged autoclave was pressure tested and evacuated. Then, 2.48 MPa of $H_2$ were added to the autoclave and $O_2$ was added to bring the total pressure to 13.9 MPa. After 15 minutes, $O_2$ was, again, added to bring the pressure up to 13.9 MPa. During the reaction, the temperature of the autoclave was between 14° and 19°. The reaction resulted in a pressure drop of 2.23 MPa. After three hours of agitation, the weight gain of the reaction mixtures was 3.40 g, the $H_2O_2$ content was 0.5 weight percent, and the selectivity to $H_2O_2$ was 1.9%. These results are shown in Table 6.

TABLE 6

Hydrogen Peroxide Yields from Bromide and Chloride Promoters

| Ex. | Comp. Exp. | Promoter(mmol) | Wt % $H_2O_2$ | Wt. Gain (g) |
|---|---|---|---|---|
| 7 | | Bromide(0.1) | 6.1 | 3.9 |
| 8 | | Bromide(0.1) | 8.6 | 3.4 |
| | I | Chloride(0.1) | 0.5 | 2.6 |

EXAMPLE 9 AND COMPARATIVE EXPERIMENTS J AND K

Preparation of Bimetallic Catalyst

A bimetallic catalyst of 0.1% Pt and 1% Pd on carbon was prepared according to the following procedure. A platinum-palladium bimetallic colloid was prepared according to a method similar to that described in Turkevich, et al., *Proc. of VII Int. Congr. Catal.* (Elsevier, New York, 1981) at page 160, the disclosure of which is incorporated herein by reference. All glassware was cleaned with aqua regia prior to use. The water used was purified by distillation and then filtered through a water purification system, equipped with mixed bed ion exchangers and an organic/colloid removal column. The following reagent solutions were prepared: 0.1320 g of $PdCl_2$ and 4 mL of 1N HCl were diluted to 100 mL with water; 0.2500 g of $H_2PtCl_6.6H_2O$ was added to 100 mL of water; and 1% sodium citrate solution. All solutions were filtered through a 0.22 micrometer millipore filter prior to use. A two liter 3 necked round bottom flask was charged with 940 mL of water. The water was brought to boiling with an electric heating mantle, and 75 mL of the chloropalladic acid solution and 5 mL of the chloroplatinic acid solution were added. The resulting solution was bright yellow.

The solution was brought to boiling, and 120 mL of 1% sodium citrate was added. Within fifteen minutes the solution became darker and at the end of thirty minutes was completely black. This solution was refluxed for four hours, whereupon it was allowed to cool and then transferred to a refrigerator for storage. Uv-vis spectroscopy and analytical electron microscopy was used to characterize the as-formed sols.

The second part of the preparation involved adsorption of this colloidal bimetallic onto a carbon support. A slurry was formed from two grams of wide pore carbon (325 mesh) having a surface area of 560 $m^2/g$ and 380 mL of the above platinum-palladium colloid. This slurry was stirred for one hour and then filtered through a 0.22 micrometer millipore filter. Uv-vis spectroscopy indicated the absence of bimetallic colloid in the filtrate. The solid remaining on the filter was allowed to air dry and then loaded into a quartz tube containing a medium-size fritted disc. This tube was put in a vertical Lindberg tube furnace, flowmeter set at 70 mL/min. The resulting sample was purged with helium for twenty minutes, after which the feed gas was switched to hydrogen and allowed to flow for ten minutes before heating to 200° C. The sample was held at 200° C. for one hour in $H_2$. It was then allowed to cool in the hydrogen atmosphere until room temperature was reached, and then flushed with helium for twenty minutes. This procedure gave a 0.1% Pt and 1.0% Pd on carbon catalyst.

EXAMPLE 9

The apparatus used was the 400 mL autoclave described in Example 1. The reaction mixture was prepared from 5 mg of the 0.1% Pt and 1.0% Pd on carbon catalyst described above, 18 g purified water, 1.0 g of 1.0N $H_2SO_4$ and 1.0 g of 0.0001N NaBr solution. The mixture was placed in a sonic cleaner bath for a couple of minutes to disperse the catalyst. The charged autoclave was pressure tested and evacuated. Then, 2.48 MPa of $H_2$ were added to the autoclave and $O_2$ was added to bring the total pressure to 13.9 MPa. After 15 minutes, $O_2$ was, again, added to bring the pressure up to 13.9 MPa. During the reaction, the temperature of the autoclave was between 16° and 19°. The reaction resulted in a pressure drop of 2.54 MPa. After three hours of agitation, the weight gain of the reaction mixture was 5.40 g, the $H_2O_2$ content was 15.8 weight percent, and the selectivity to $H_2O_2$ was 61%. These results are shown in Table 7.

COMPARATIVE EXPERIMENTS J AND K

The procedure described in Example 9 was substantially repeated two times, except that chloride promoters were employed. The apparatus used was the 400 mL autoclave described in Example 1. The reaction mixtures were prepared from 5 mg of the 0.1% Pt and 1.0% Pd on carbon catalyst described above, 18 g purified water, 1.0 g of 1.0N $H_2SO_4$ and 1.0 g of 0.0001N NaCl solution. The mixtures were placed in a sonic cleaner bath for a couple of minutes to disperse the catalyst. In each experiment, the charged autoclave was pressure tested and evacuated. Then, 2.48 MPa of $H_2$ were added to the autoclave and $O_2$ was added to bring the total pressure to 13.9 MPa. After 15 minutes, $O_2$ was, again, added to bring the pressure up to 13.9 MPa. During the reaction, the temperature of the autoclave was between 16° and 19°. The reactions resulted in pressure drops of 2.96 MPa and 2.71 MPa. After three hours of agitation, the weight gains of the reaction mixtures were 4.48 g and 4.37 g, the $H_2O_2$ contents were 2.4 and 2.2 weight percent, and the selectivities to $H_2O_2$ were 7.4% and 6.9%, respectively. These results are shown in Table 7.

TABLE 7

Hydrogen Peroxide Yields from Bromide and Chloride Promoters

| Ex. | Comp. Exp. | Promoter(mmol) | Wt % $H_2O_2$ | Wt. Gain (g) |
|---|---|---|---|---|
| 9 | | Bromide(0.0001) | 15.8 | 5.4 |
| | J | Chloride(0.0001) | 2.4 | 4.5 |
| | K | Chloride(0.0001) | 2.2 | 4.4 |

EXAMPLE 10 AND COMPARATIVE EXPERIMENTS L AND M

Preparation of Bimetallic Catalyst

A 0.05% Pt and 1% Pd on silica catalyst was prepared according to the following procedure using metal salts as the metal source. The following reagent solutions were prepared: 0.0052 g. of $H_2PtCl_6.6H_2O$ was dissolved in 380 mL water, (purified as described above in Example 9) and 0.0632 g of $PdCl_2$ and 3 mL in HCl were diluted to 380 mL with water. The as prepared chloropalladic acid solution and chloroplatinic acid solutions were combined and stirred for approximately ten minutes. To this was added 10 g of an aqueous colloidal dispersion of silica particles commercially available from E.I. du Pont de Nemours and Company under the registered trademark Ludox-HS-40 ®. This mixture was stirred for approximately 5 minutes and then spray-dried using a Buchi laboratory scale spray-dryer. The spray-drying conditions were as follows: inlet temperature=220° C. outlet temperature=110° C. The material collected from the spray-drying was a light orange powder. The powder was subjected to a hydrogen procedure similar to that described in Example 9, except that 300° C. was used.

EXAMPLE 10

The apparatus used was the 400 mL autoclave described in Example 1. The reaction mixture was prepared from 5 mg of the 0.05% Pt and 1% Pd on silica catalyst described above, 18 g purified water, 1.0 g of 1.0N $H_2SO_4$ and 1.0 g of 0.0001N NaBr solution. The mixture was placed in a sonic cleaner bath for a couple of minutes to disperse the catalyst. The charged autoclave was pressure tested and evacuated. Then, 2.48 MPa of $H_2$ were added to the autoclave and $O_2$ was added to bring the total pressure to 13.9 MPa. After 15 minutes, $O_2$ was, again, added to bring the pressure up to 13.9 MPa. During the reaction, the temperature of the autoclave was between 16° and 19°. The reaction resulted in a pressure drop of 2.12 MPa. After three hours of agitation, the weight gain of the reaction mixture was 4.79 g, the $H_2O_2$ content was 15.5 weight percent, and the selectivity to $H_2O_2$ was 68%. These results are shown in Table 8.

COMPARATIVE EXPERIMENTS L AND M

The procedure described in Example 10 was substantially repeated two times, except that chloride promoters were employed. The apparatus used was the 400 mL autoclave described in Example 1. The reaction mixtures were prepared from 5 mg of the 0.05% Pt and 1% Pd on silica catalyst described above, 18 g purified water, 1.0 g of 1.0N $H_2SO_4$ and 1.0 g of 0.001N NaCl solution. The mixtures were placed in a sonic cleaner bath for a couple of minutes to disperse the catalyst. In each experiment, the charged autoclave was pressure tested and evacuated. Then, 2.48 MPa of $H_2$ were added to the autoclave and $O_2$ was added to bring the total pressure to 13.9 MPa. After 15 minutes, $O_2$ was, again, added to bring the pressure up to 13.9 MPa. During the reaction, the temperature of the autoclave was between 16° and 19°. The reactions resulted in pressure drops of 2.16 MPa and 2.42 MPa. After three hours of agitation, the weight gains of the reaction mixtures were 3.75 g and 3.81 g, the $H_2O_2$ contents were 7.8 and 7.6 weight percent, and the selectivities to $H_2O_2$ were 34% and 32%, respectively. The results are shown in Table 8.

TABLE 8

Hydrogen Peroxide Yields from Bromide and Chloride Promoters

| Ex. | Comp. Exp. | Promoter(mmol) | Wt % $H_2O_2$ | Wt. Gain (g) |
|---|---|---|---|---|
| 10 | | Bromide(0.0001) | 15.9 | 4.8 |
| | L | Chloride(0.0001) | 7.8 | 3.8 |
| | M | Chloride(0.0001) | 7.6 | 3.8 |

EXAMPLE 11 AND COMPARATIVE EXPERIMENTS N AND O

Preparation of Bimetallic Catalyst

A 0.1% Pt and 1% Pd on alumina catalyst was prepared according to a two step procedure similar to that described in Example 9. First, a ten liter batch of platinum-palladium bimetallic colloid was prepared using a procedure similar to that described in Example 9. Second, a 380 mL aliquot of this black platinum-palladium colloid was slurried with 2.0 g of $Al_2O_3$ (Sumitomo AKP-50) having a surface area of about 12 m²/g. The resulting mixture was stirred and then spray-dried using a Buchi laboratory scale spray-dryer. The spray-drying conditions were as follows: inlet temperature=220° C. outlet temperature=110° C. The spray-dried material was a gray-brown powder. This sample was given a hydrogen treatment similar to that described in Example 9 to give the 0.1% Pt and 1.0% Pd on $Al_2O_3$ catalyst.

EXAMPLE 11

The apparatus used was the 400 mL autoclave described in Example 1. The reaction mixture was prepared from 5 mg of the 0.1% Pt and 1.0% Pd on $Al_2O_3$ catalyst described above, 18 g purified water, 1.0 g of 1.0N $H_2SO_4$ and 1.0 g of 0.0001N NaBr solution. The mixture was placed in a sonic cleaner bath for a couple of minutes to disperse the catalyst. The charged autoclave was pressure tested and evacuated. Then, 2.48 MPa of $H_2$ were added to the autoclave and $O_2$ was added to bring the total pressure to 13.9 MPa. After 15 minutes, $O_2$ was, again, added to bring the pressure up to 13.9 MPa. The initial temperature of the autoclave was 20°. The reaction resulted in a pressure drop of 2.36 MPa. After three hours of agitation, the weight gain of the reaction mixture was 5.04 g, the $H_2O_2$ content was 16.4 weight percent, and the selectivity to $H_2O_2$ was 70%.

COMPARATIVE EXPERIMENTS N AND O

The procedure described in Example 11 was substantially repeated two times, except that chloride promoters were employed. The apparatus used was the 400 mL autoclave described in Example 1. The reaction mixtures were prepared from 5 mg of the 0.05% Pt and 1% Pd on silica catalyst described above, 18 g purified water, 1.0 g of 1.0N $H_2SO_4$ and 1.0 g of 0.0001N NaCl solution. The mixtures were placed in a sonic cleaner bath for a couple of minutes to disperse the catalyst. In each experiment, the charged autoclave was pressure tested and evacuated. Then, 2.48 MPa of $H_2$ were added to the autoclave and $O_2$ was added to bring the total pressure to 13.9 MPa. After 15 minutes, $O_2$ was, again, added to bring the pressure up to 13.9 MPa. During the reaction, the temperature of the autoclave was between 16° and 20°. The reactions resulted in pressure drops of 3.30 MPa and 2.86 MPa. After three hours of agitation, the weight gains of the reaction mixtures were 4.84 g and 4.62 g, the $H_2O_2$ contents were 9.5 and 9.1 weight percent, and the selectivities to $H_2O_2$ were 32% and 35%, respectively.

EXAMPLE 12 AND COMPARATIVE EXPERIMENTS P AND Q

Palladium Catalyst Preparation

A 4% Pd on a perfluorinated polymer catalyst was prepared according to the following procedure. The acid form of a perfluorinated polymer, commercially available from E.I. du Pont de Nemours and Company under the registered trademark Nafion ® 511 (44.2 g) was ball milled for 16 h and then sieved to obtain a 230–400 mesh fraction weighing 10.5 g. The specified polymer has an equivalent weight of 1100. A 5.5 g portion of the 230–400 mesh) fraction was slurried with $Pd(NO_3)_2 \cdot xH_2O$ (x=2, 0.72 g, 2.71 mmol) in 100 mL distilled water. The solution was heated at 80° C. for 5.5 h. The resulting exchanged resin was filtered and the filtrate was evaporated to dryness. No residue remained after evaporation. This $Pd^{+2}$ exchanged resin was washed with 2×200 mL distilled water and the washings discarded. After drying the resulting resin in a vacuum oven under $N_2$ for 1.5 h at 100° C., it weighed 5.4 g. Palladium analysis by Galbraith Laboratories was 4.26%.

EXAMPLE 12

The apparatus used was the 400 mL autoclave described in Example 1. The reaction mixture was prepared from 25 mg of the 4% Pd on perfluorinated polymer catalyst (230–400 mesh) described above, 18 g purified water, 1.0 g of 1.0N $H_2SO_4$ and 1.0 g of 0.01N NaBr solution. The mixture was placed in a sonic cleaner bath for a couple of minutes to disperse the catalyst. The charged autoclave was pressure tested and evacuated. Then, 2.48 MPa of $H_2$ were added, and $O_2$ was added to bring the total pressure to 13.9 MPa. After 15 minutes, $O_2$ was, again, added to bring the pressure up to 13.9 MPa. During the reaction, the temperature of the autoclave was between 16° and 19°. The reaction resulted in a pressure drop of 4.08 MPa. After three hours of agitation, the weight gain of the reaction mixture was 4.29 g, the $H_2O_2$ content was 9.3 weight percent, and the selectivity to $H_2O_2$ was 37%.

COMPARATIVE EXPERIMENTS P AND Q

The procedure described in Example 11 was substantially repeated two times, except that chloride promoters were employed. The apparatus used was the 400 mL autoclave described in Example 1. The reaction mixtures were prepared from 25 mg of the 4% Pd on perfluorinated polymer catalyst described above, 18 g purified water, 1.0 g of 1.0N $H_2SO_4$ and 1.0 g of 0.01N NaCl solution. The mixtures were placed in a sonic cleaner bath for a couple of minutes to disperse the catalyst. In each experiment, the charged autoclave was pressure tested and evacuated. Then, 2.48 MPa of $H_2$ were added and $O_2$ was added to bring the total pressure to 13.9 MPa. After 15 minutes, $O_2$ was, again, added to bring the pressure up to 13.9 MPa. During the reactions, the temperature of the autoclave was between 13° and 18°. The reactions resulted in pressure drops of 3.37 MPa and 3.46 MPa. After three hours of agitation, the weight gains of the reaction mixtures were 4.97 g and 4.72 g. The $H_2O_2$ content and the selectivity to $H_2O_2$ were 0.0 in each experiment.

EXAMPLE 13

The apparatus used was the 400 mL autoclave described in Example 1. The reaction mixture was prepared from 10 mg of the 5% Pd on carbon catalyst described in Example 1 (400–500 mesh), 18 g purified water, 1.0 g of 1N $H_2SO_4$, and 1.0 g of a solution of $Br_2$ in water diluted to about 0.0001 M. The mixture was placed in a sonic cleaner bath for a couple of minutes to disperse the catalyst. The charged autoclave was pressure tested and evacuated. Then, 2.49 MPa of $H_2$ were added and $O_2$ was added to bring the total pressure to 13.9 MPa. After 15 minutes, $O_2$ was, again, added to bring the pressure up to 13.9 MPa. During the reaction, the temperature of the autoclave was between 10° and 13°. The reaction resulted in a pressure drop of 2.64 MPa. After three hours of agitation, the weight gain of the reaction mixture was 5.15 g, the $H_2O_2$ content was 12.9 weight percent, and the selectivity to $H_2O_2$ was 47%.

EXAMPLE 14

The apparatus used was the 400 mL autoclave described in Example 1. The reaction mixture was prepared from 10 mg of the 5% Pd on carbon catalyst described in Example 1 (400–500 mesh), 19 g purified water, 1.0 g of 1N $H_2SO_4$, and 2 mg of sodium bromate. The mixture was placed in a sonic cleaner bath for a couple of minutes to disperse the catalyst. The charged autoclave was pressure tested and evacuated. Then, 2.48 MPa of $H_2$ were added and $O_2$ was added to bring the total pressure to 13.9 MPa. After 15 minutes, $O_2$ was, again, added to bring the pressure up to 13.9 MPa.

During the reaction, the temperature of the autoclave was between 9° and 11°. The ensuing reaction resulted in a pressure drop of 2.73 MPa. After three hours of agitation, the
weight gain of the reaction mixture was 6.01 g, the $H_2O_2$ content was 18.6 weight percent, and the selectivity to $H_2O_2$ was 69%.

EXAMPLES 15–19

In these examples, hydrogen peroxide was produced employing phosphoric, trifluoroacetic, and trifluoromethanesulfonic acids in the reaction mixture. The apparatus used was the 400 mL autoclave described in Example 1.

In Example 15, the reaction mixture was prepared from 20 mg of the 5% Pd on carbon catalyst described in Example 1 (400 mesh), 16.5 g distilled water, 1.0 g of 0.01N NaBr, and 2.5 g of 0.2M $H_3PO_4$. The charged autoclave was pressure tested and evacuated. Then, 2.48 MPa of $H_2$ were added and $O_2$ was added to bring the total pressure to 13.9 MPa. After 15 minutes, $O_2$ was, again, added to bring the pressure up to 13.9 MPa. During the reaction, the temperature of the autoclave was between 7° and 11°. The reaction resulted in a pressure drop of 2.70 MPa. After three hours of agitation, the weight gain of the reaction mixture was 6.12 g, the $H_2O_2$ content was 17.3 weight percent, and the selectivity to $H_2O_2$ was 60%.

In Example 16, the reaction mixture was prepared from 10 mg of the 5% Pd on carbon catalyst (400 mesh), 18.5 g distilled water, 1.0 g of 0.01N HBr, and 0.5 g of 0.1M $CF_3COOH$. The charged autoclave was pressure tested and evacuated. Then, 2.48 MPa of $H_2$ were added and $O_2$ was added to bring the total pressure to 13.9 MPa. After 15 minutes, $O_2$ was, again, added to bring the pressure up to 13.9 MPa. During the reaction, the temperature of the autoclave was between 14° and 17°. The reaction resulted in a pressure drop of 2.79 MPa. After three hours of agitation, the weight gain of the reaction mixture was 5.49 g, the $H_2O_2$ content was 14.4 weight percent, and the selectivity to $H_2O_2$ was 52%.

In Example 17, the reaction mixture was prepared from 10 mg of the 5% Pd on carbon catalyst (400 mesh), 18.5 g distilled water, 1.0 g of 0.01N HBr, and 0.5 g of 0.1M $CF_3SO_3H$. The charged autoclave was pressure tested and evacuated. Then, 2.43 MPa of $H_2$ were added and $O_2$ was added to bring the total pressure to 13.9 MPa. After 15 minutes, $O_2$ was, again, added to bring the pressure up to 1.39 MPa. During the reaction, the temperature of the autoclave was between 14° and 15°. The reaction resulted in a pressure drop of 2.82 MPa. After three hours of agitation, the weight gain of the reaction mixture was 5.53 g, the $H_2O_2$ content was 14.2 weight percent, and the selectivity to $H_2O_2$ was 50%.

In Example 18, the reaction mixture was prepared from 10 mg of the 5% Pd on carbon catalyst (400 mesh), 9.0 g distilled water, 1.0 g of 0.01N NaBr, and 0 g of 0.2M $H_3BO_3$. The charged autoclave was pressure tested and evacuated. Then, 2.48 MPa of $H_2$ were added and $O_2$ was added to bring the total pressure to 13.9 MPa. After 15 minutes, $O_2$ was, again, added to bring the pressure up to 13.9 MPa. During the reaction, the temperature of the autoclave was between 8° and 11°. The reaction resulted in a pressure drop of 2.49 MPa. After three hours of agitation, the weight gain of the reaction mixture was 4.76 g, the $H_2O_2$ content was 7.9 weight percent, and the selectivity to $H_2O_2$ was 26%.

In Example 19, the reaction mixture was prepared from 10 mg of the 5% Pd on carbon catalyst (400 mesh), 17.0 g distilled water, 1.0 g of 0.01N HBr, and 2 g of 0.2M $HNO_3$. The charged autoclave was pressure tested and evacuated. Then, 2.48 MPa of $H_2$ were added and $O_2$ was added to bring the total pressure to 13.9 MPa. After 15 minutes, $O_2$ was, again, added to bring the pressure up to 13.9 MPa. During the reaction, the temperature of the autoclave was between 13° and 16°. The reaction resulted in a pressure drop of 2.17 MPa. After three hours of agitation, the weight gain of the reaction mixture was 5.66 g, the $H_2O_2$ content was 16.9 weight percent, and the selectivity to $H_2O_2$ was 63%.

COMPARATIVE EXPERIMENTS R–Z

In these comparative experiments, hydrogen peroxide was produced employing sulfate, phosphate, perchlorate, nitrite, cyanate, hexafluorosilicate, nitrate, thiocyanate and iodide promoters. The apparatus used was the 400 mL autoclave described in Example 1.

In Comparative Experiment R, the reaction mixture was prepared from 10 mg of the 5% Pd on carbon catalyst (400 mesh), 9.5 g purified water, 0.5 g of 4N $H_2SO_4$. The charged autoclave was pressure tested and evacuated. Then, 2.48 MPa of $H_2$ were added and $O_2$ was added to bring the total pressure to 13.9 MPa. After 15 minutes, $O_2$ was, again, added to bring the pressure up to 13.9 MPa. During the reaction, the temperature of the autoclave was between 10° and 11°. The reaction resulted in a pressure drop of 2.40 MPa. After three hours of agitation, the weight gain of the reaction mixture was 4.19 g. The $H_2O_2$ content was 0.0 weight percent and the selectivity to $H_2SO_4$ was 0.0%.

In Comparative Experiment S, the reaction mixture was prepared from 10 mg of the 5% Pd on carbon catalyst (325 mesh), 9.5 g purified water and 0.5 g of 2M $H_3PO_4$. The charged autoclave was pressure tested and evacuated. Then, 2.48 MPa of $H_2$ were added and $O_2$ was added to bring the total pressure to 13.9 MPa. After 15 minutes, $O_2$ was, again, added to bring the pressure up to 13.9 MPa. During the reaction, the temperature of the autoclave was between 13° and 15°. The reaction resulted in a pressure drop of 2.67 MPa. After three hours of agitation, the weight gain of the reaction mixture was 4.12 g. The $H_2O_2$ content was 0.0 weight percent and the selectivity to $H_2O_2$ was 0.0%.

In Comparative Experiment T, the reaction mixture was prepared from 10 mg of the 5% Pd on carbon catalyst (400–500 mesh), 18 g purified water, 2 g of 1N $H_2SO_4$, and 12 mg of sodium perchlorate. The charged autoclave was pressure tested and evacuated. Then, 2.48 MPa of $H_2$ were added and $O_2$ was added to bring the total pressure to 13.9 MPa. After 15 minutes, $O_2$ was, again, added to bring the pressure up to 13.9 MPa. During the reaction, the temperature of the autoclave was between 9° and 17°. The reaction resulted in a pressure drop of 2.60 MPa. After three hours of agitation, the weight gain of the reaction mixture was 4.58 g, the $H_2O_2$ content was 0.2 weight percent, and the selectivity to $H_2O_2$ was 0.6%.

In Comparative Experiment U, the reaction mixture was prepared from 5 mg of the 5% Pd on carbon catalyst (400–500 mesh), 19 g purified water, 1 g of 1N $H_2SO_4$, and 5 mg of sodium nitrite. The charged autoclave was pressure tested and evacuated. Then, 2.48 MPa of $H_2$ were added and $O_2$ was added to bring the total pressure to 13.9 MPa. After 15 minutes, $O_2$ was, again, added to bring the pressure up to 13.9 MPa.

During the reaction, the temperature of the autoclave was between 10° and 12°. The reaction resulted in a pressure drop of 2.42 MPa. After three hours of agitation, the weight gain of the reaction mixture was 3.03 g, the $H_2O_2$ content was 3.4 weight percent, and the selectivity to $H_2O_2$ was 16%.

In Comparative Experiment V, the reaction mixture was prepared from 5 mg of the 5% Pd on carbon catalyst (400-500 mesh), 19 g purified water, 1 g of 1N $H_2SO_4$, and 5 mg of sodium cyanate. The charged autoclave was pressure tested and evacuated. Then, 2.48 MPa of $H_2$ were added and $O_2$ was added to bring the total pressure to 13.9 MPa. After 15 minutes, $O_2$ was, again, added to bring the pressure up to 13.9 MPa. During the reaction, the temperature of the autoclave was between 7° and 11°. The reaction resulted in a pressure drop of 1.97 MPa. After three hours of agitation, the weight gain of the reaction mixture was 3.43 g, the $H_2O_2$ content was 0.4 weight percent, and the selectivity to $H_2O_2$ was 2%.

In Comparative Experiment W, the reaction mixture was prepared from 10 mg of the 5% Pd on carbon catalyst (400-500 mesh), 19 g purified water, 1 g of 1N $H_2SO_4$, and 40 mg of sodium hexafluorosilicate. The charged autoclave was pressure tested and evacuated. Then, 2.48 MPa of $H_2$ were added and $O_2$ was added to bring the total pressure to 13.9 MPa. After 15 minutes, $O_2$ was, again, added to bring the pressure up to 13.9 MPa. During the reaction, the temperature of the autoclave was between 10° and 14°. The reaction resulted in a pressure drop of 2.98 MPa. After three hours of agitation, the weight gain of the reaction mixture was 4.84 g, the $H_2O_2$ content was 0.0 weight percent, and the selectivity to $H_2O_2$ was 0.0.

In Comparative Experiment X, the reaction mixture was prepared from 5 mg of the 5% Pd on carbon catalyst (400-500 mesh), 18 g purified water, 1 g of 1N $H_2SO_4$, and 1 g of 0.1N nitric acid. The charged autoclave was pressure tested and evacuated. Then, 2.48 MPa of $H_2$ were added and $O_2$ was added to bring the total pressure to 13.9 MPa. After 15 minutes, $O_2$ was, again, added to bring the pressure up to 13.9 MPa. During the reaction, the temperature of the autoclave was between 10° and 13°. The reaction resulted in a pressure drop of 2.25 MPa. After three hours of agitation, the weight gain of the reaction mixture was 3.72 g, the $H_2O_2$ content was 1.3 weight percent, and the selectivity to $H_2O_2$ was 5%.

In Comparative Experiment Y, the reaction mixture was prepared from 10 mg of the 5% Pd on carbon catalyst (400-500 mesh), 19 g purified water, 1 g of 1N $H_2SO_4$, and 0.4 mg of potassium thiocyanate. The charged autoclave was pressure tested and evacuated. Then, 2.48 MPa of $H_2$ were added and $O_2$ was added to bring the total pressure to 13.9 MPa. After 15 minutes, $O_2$ was, again, added to bring the pressure up to 13.9 MPa. During the reaction, the temperature of the autoclave was between 9° and 11°. The reaction resulted in a pressure drop of 7 kPa. After three hours of agitation, the weight gain of the reaction mixture was 0.44 g, the $H_2O_2$ content was 0.6 weight percent, and the selectivity to $H_2O_2$ was 17%.

In Comparative Experiment Z, the reaction mixture was prepared from 10 mg of the 5% Pd on carbon catalyst (325 mesh), 8.5 g purified water, 0.5 g of 4N $H_2SO_4$, and 1.0 g of 0.001N potassium iodide. The charged autoclave was pressure tested and evacuated. Then, 2.48 MPa of $H_2$ were added and $O_2$ was added to bring the total pressure to 13.9 MPa. After 15 minutes, $O_2$ was, again, added to bring the pressure up to 13.9 MPa. During the reaction, the temperature of the autoclave was between 10° and 11°. The reaction resulted in a pressure drop of 540 kPa. After three hours of agitation, the weight gain of the reaction mixture was 1.08 g, the $H_2O_2$ content was 6.0 weight percent, and the selectivity to $H_2O_2$ was 46%.

EXAMPLE 20

This example illustrates the use of a bromide promoter in a continuous reactor. The apparatus was a nominally 125 mL reactor equipped with a glass liner, tantalum baffles and a tantalum gas dispersion stirrer. The reactor was fitted with lines to supply $H_2$ and $O_2$ and a liquid feed during the reaction period. There was also a gas exit line and a nickel filter frit to retain the catalyst while allowing a liquid exit stream to flow as needed to keep the reactor slurry volume about 45 mL. Samples of the liquid exit stream were titrated with potassium permanganate. The reactor was mounted in a metal barricade.

The reaction mixture was prepared from 1.25 g of 80% $H_3PO_4$, 20 g of 0.1N NaBr and 40 g of 2.5N $H_2SO_4$ and purified water to bring the total volume to 2 L. The catalyst was 150 mg of a 5% Pd/C sieved to 325-400 mesh, commercially available from Alfa Products Company. During the run the temperature was 21° C. $H_2$ (3% He) was fed at 40 mL/min and $O_2$ at 110 mL/min (ambient temperature & atmospheric pressure) while the reaction pressure was maintained at 7.0 MPa. The acid/bromide solution was pumped into the reactor at 0.025 mL/min. The exit liquid contained about 25 weight percent hydrogen peroxide for about 24 hours of operation.

EXAMPLE 21

The apparatus was as described in Example 20 except that a fluorocarbon polymer (Teflon®) liner was used in place of the glass one. The liquid feed solution was the same as above, but it was pumped at 0.05 mL/min. The catalyst was 450 mg of a 0.1% Pt and 1% Pd on silica. A bimetallic colloid was prepared according to a method similar to that described in Example 9. 3800 mL of the metal colloid was mixed with 50 g of a colloidal silica commercially available from E.I. du Pont de Nemours and Company under the registered trademark Ludox-HS40®. The resulting mixture was spray dried using a Niro spray dryer with a rotary disc atomizer at 220°. The resulting solid was reduced in $H_2$ according to a method similar to that described in Example 9 to form the catalyst. The slurry volume in the reactor was about 50 mL. The total pressure was about 6.89 MPa. Oxygen was fed at about 141 mL/min and $H_2$-He at about 14 mL/min (flows referenced to 1 atmosphere and room temperature). The reactor temperature was about 20° C. The exit liquid contained about 11 weight percent hydrogen peroxide for about 600 hours of operations.

EXAMPLE 22

This example demonstrates use of a bromide promoter in a semibatch (semicontinuous) system. The catalyst was a 0.2% Pt and 2% Pd on silica. A bimetallic colloid was prepared according to a method similar to that described in Example 9. 760 mL of the metal colloid were mixed with 5 g of a colloidal silica commercially available from E.I. du Pont de Nemours and Company under the registered trademark Ludox-HS40®. The resulting mixture was spray dried using a Buchi Laboratory spray dryer. The resulting solid was reduced in $H_2$ according to a method similar to that described in Example 9 to form the catalyst. A glass reactor with a tantalum stirrer was charged with a mixture of 5 mg of the 0.2% Pt and 2% Pd on silica catalyst and 1 g of a solution prepared by mixing 9.0 g purified water, 10.0 g 1N $H_2SO_4$, and 1.0 g 0.01N NaBr. The mixture was sparged with $H_2$ for a minute. The reactor was placed on a rocker in a steel barricade and attached to gas supply and exit equipment. During the reaction period a mixture of 7% He in $H_2$ was fed at about 3 mL/min and $O_2$ was fed at about 11 mL/min (referenced to ambient pressure and temperature). Gas was allowed to flow from the reactor to maintain the total pressure near 9.65 MPa. After 68 hours agitation in an about 2° C. cooling bath the reaction mixture weighed 4.1 g and contained 45.7 weight percent $H_2O_2$.

EXAMPLE 23

This experiment was carried out according to a method similar to that described in Example 22 except that 5 mg of commercial 5% Pd/C (Alpha Products Co.) sieved to 400 to 500 mesh was used in place of the Pt, Pd bimetallic catalyst. The recovered reaction mixture weighed 5.3 g and contained 35.8 weight percent $H_2O_2$.

What is claimed is:

1. An improved catalytic process for making hydrogen peroxide from hydrogen and oxygen in a reaction medium, wherein the improvement comprises:
   (i) employing a catalytically effective amount of palladium, platinum, or a combination thereof,
   (ii) employing an aqueous reaction medium comprising an acid component and a bromide promoter, the bromide ion concentration in the reaction medium being from about $1 \times 10^{-7}$M to about 0.1M, and
   (iii) employing the acid component and bromide promoter in amounts to provide a molar ratio of hydrogen ion to bromide ion of at least about 2:1 in the reaction medium, the molar excess of hydrogen ion over bromide ion being supplied by an acid component other than hydrobromic acid.

2. A method according to claim 1, wherein the ratio of palladium to platinum is above about 20 weight percent.

3. A method according to claim 2, wherein the ratio of palladium to platinum is above about 50 weight percent.

4. A method according to claim 1, wherein the palladium, platinum or combination thereof is employed in the form of metal ions as a result of using palladium and/or platinum salts.

5. A method according to claim 1, wherein the palladium, platinum or combination thereof is employed in the form of a supported catalyst.

6. A method according to claim 5, wherein the palladium, platinum, or combination thereof is employed in the form of a supported catalyst prepared from a metal colloid.

7. A method according to claim 1, wherein the palladium, platinum or combination thereof is employed in the form of a colloid.

8. A method according to claim 1, wherein the bromide ion concentration is from about $5 \times 10^{-5}$ M to about 0.01M.

9. A method according to claim 1, wherein the molar ratio of bromide ion to metal is from about $10^2$:1 to about $10^{-3}$:1.

10. A method according to claim 9, wherein the molar ratio of bromide ion to metal is from about 10:1 to about $10^{-2}$:1.

11. A method according to claim 1, wherein the hydrogen ion concentration is from about $1 \times 10^{-5}$M to about 10M.

12. A method according to claim 11, wherein the hydrogen ion concentration is from about $1 \times 10^{-3}$M to about 2M.

13. A method according to claim 1, wherein the molar ratio of hydrogen ion to bromide ion in the reaction medium is from about 5:1 to about $10^6$:1.

14. A method according to claim 13, wherein the molar ratio of hydrogen ion to bromide ion is from about 10:1 to about $10^4$:1.

15. A method according to claim 14, wherein the molar ratio of hydrogen ion to bromide ion is from about 100:1 to about $10^4$:1.

16. A method according to claim 13, wherein the method is conducted at a temperature of from about −50° C. to about 90° C.

17. A method according to claim 16, wherein the temperature is from about 0° C. to about 50° C.

18. A method according to claim 17, wherein the method is conducted at a superatmospheric pressure.

19. A method according to claim 18, wherein the pressure is from about 1.48 MPa to about 27.7 MPa.

20. A method according to claim 19, wherein the pressure is from about 2.86 MPa to about 17.34 MPa.

21. An improved catalytic process for making hydrogen peroxide from hydrogen and oxygen in a reaction medium, wherein the improvement comprises:
   (i) employing a catalytically effective amount of palladium, platinum, or a combination thereof in the form of metal ions as a result of using palladium and/or platinum salts,
   (ii) employing an aqueous reaction medium comprising an acid component and a bromide promoter, the bromide ion concentration in the reaction medium being from about $1 \times 10^{-7}$M to about 0.1M, and
   (iii) employing the acid component and bromide promoter in amounts to provide a molar ratio of hydrogen ion to bromide ion of at least about 2:1 in the reaction medium, the molar excess of hydrogen ion over bromide ion being supplied by an acid component other than hydrobromic acid.

22. A method according to claim 21, wherein the ratio of palladium to platinum is above about 20 weight percent.

23. A method according to claim 22, wherein the ratio of palladium to platinum is above about 50 weight percent.

24. A method according to claim 21, wherein the molar ratio of bromide ion to metal is from about $10^2$:1 to about $10^{-3}$:1.

25. A method according to claim 21, wherein the hydrogen ion concentration is from about $1 \times 10^{-5}$M to about 10M.

26. A method according to claim 21, wherein the molar ratio of hydrogen ion to bromide ion in the reaction medium is from about 5:1 to about $10^6$:1.

27. A method according to claim 21, wherein the method is conducted at a temperature of from about −50° C. to about 90° C.

28. A method according to claim 27, wherein the method is conducted at a superatmospheric pressure.

* * * * *